(12) United States Patent
Heo et al.

(10) Patent No.: US 11,481,564 B2
(45) Date of Patent: Oct. 25, 2022

(54) TRAY DEVICE AND ELECTRONIC DEVICE HAVING THE SAME

(71) Applicant: SAMSUNG ELECTRONICS CO., LTD., Suwon-si (KR)

(72) Inventors: Joon Heo, Suwon-si (KR); Yonghwa Kim, Suwon-si (KR); Minyoung Sung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 60 days.

(21) Appl. No.: 16/883,117

(22) Filed: May 26, 2020

(65) Prior Publication Data

US 2021/0042478 A1 Feb. 11, 2021

(30) Foreign Application Priority Data

Aug. 8, 2019 (KR) .................. 10-2019-0096609

(51) Int. Cl.
*G06K 7/00* (2006.01)
*G06K 13/08* (2006.01)
(Continued)

(52) U.S. Cl.
CPC ......... *G06K 7/003* (2013.01); *G06K 13/0825* (2013.01); *G06K 13/0831* (2013.01);
(Continued)

(58) Field of Classification Search
CPC combination set(s) only.
See application file for complete search history.

(56) References Cited

U.S. PATENT DOCUMENTS

| 7,766,678 B1* | 8/2010 | Abe ............... H05K 5/0295 439/159 |
| 2002/0132528 A1 | 9/2002 | Harasawa et al. |

(Continued)

FOREIGN PATENT DOCUMENTS

| KR | 10-2018-0006707 | 1/2018 |
| KR | 10-2046348 B1 | 11/2019 |
| KR | 10-2020-0121147 A | 10/2020 |

OTHER PUBLICATIONS

International Search Report dated Aug. 27, 2020 in corresponding International Application No. PCT/KR2020/006701.

*Primary Examiner* — Junpeng Chen
(74) *Attorney, Agent, or Firm* — Nixon & Vanderhye P.C.

(57) ABSTRACT

According to various embodiments, an electronic device may include: a housing including an opening connected to an internal space of the electronic device; a tray socket connected to outside the electronic device through the opening in the internal space and including a tray reception space; a tray configured to be inserted into the tray reception space, wherein the tray includes a tray body including at least one space configured to receive at least one external component; and a tray cover including a pin insertion hole configured to guide a tray ejecting pin to the opening; an eject bar movably disposed in a tray mounting direction or ejecting direction in the tray reception space and facing the pin insertion hole; and a rotation lever configured to press the tray in the ejection direction based on pressing of the eject bar in the tray reception space, wherein the eject bar is disposed at a position at least partially overlapping the tray body when viewed from above the tray socket.

20 Claims, 15 Drawing Sheets

(51) Int. Cl.
*H04M 1/02* (2006.01)
*H04B 1/3818* (2015.01)

(52) U.S. Cl.
CPC ........ *H04B 1/3818* (2015.01); *H04M 1/0274* (2013.01); *H04M 1/0277* (2013.01)

(56) References Cited

U.S. PATENT DOCUMENTS

| | | | |
|---|---|---|---|
| 2013/0050964 A1* | 2/2013 | Kume | G06K 13/0825 361/754 |
| 2013/0148636 A1* | 6/2013 | Lum | H04B 1/0067 370/336 |
| 2015/0072549 A1* | 3/2015 | Okoshi | H01R 13/62988 439/160 |
| 2015/0155651 A1 | 6/2015 | Ejiri | |
| 2016/0072539 A1 | 3/2016 | Hu et al. | |
| 2016/0111802 A1* | 4/2016 | Shimotsu | G06K 13/08 439/660 |
| 2016/0164226 A1* | 6/2016 | Hirata | H04B 1/3816 439/155 |
| 2016/0266619 A1* | 9/2016 | Heiskanen | G06F 1/186 |
| 2017/0093057 A1 | 3/2017 | Wang et al. | |

* cited by examiner

TRAY DEVICE AND ELECTRONIC DEVICE HAVING THE SAME

CROSS-REFERENCE TO RELATED APPLICATION

This application is based on and claims priority under 35 U.S.C. § 119 to Korean Patent Application No. 10-2019-0096609, filed on Aug. 8, 2019, in the Korean Intellectual Property Office, the disclosure of which is incorporated by reference herein in its entirety.

BACKGROUND

Field

The disclosure relates to a tray device and an electronic device including the same.

Description of Related Art

In recent years, portable electronic devices have been diversified in function, while portable electronic devices with favorable portability may have higher competitiveness. For example, an electronic device that is slimmer, lighter, and shorter among electronic devices having the same function may be preferred. Therefore, electronic device manufacturers are racing to develop devices that are slimmer, lighter, and shorter than other products while having the same or better function.

As part of this trend, electronic devices may include removable external components (e.g., external cards) selectively or necessarily applied therein, and these external components may be gradually miniaturized. For example, such external components may include card-type external components such as a memory card, a subscriber identification module (SIM) card, or a user information module (UIM) card, and improvement measures for efficiently disposing these external components in the electronic device may be provided.

The external components detachably applied to the electronic device may be mounted in a tray socket disposed inside the electronic device to be electrically connected to a printed circuit board of the electronic device, and have a configuration of the tray device in which the external components are electrically connected to the electronic device with only an operation of mounting the tray in the tray socket using a tray to which external components may be applied.

Recently, in order to meet slimming of the electronic device and to secure an efficient component mounting space, the tray device may include a tray mounted in a manner that at least two card-type external components are at least partially stacked. When the tray is mounted in a socket disposed inside the electronic device, at least two card-type external components may be electrically connected to the printed circuit board of the electronic device.

The tray device may include a fixing structure for fixing the tray mounted in the electronic device and an ejecting structure for ejecting the mounted tray from the electronic device. The mounting structure may be provided through a shape change and/or a latching structure of the socket and the tray, and the ejection structure may be provided through a separate eject bar and rotation lever. The ejecting structure may be pressed by the eject bar operating in a tray mounting direction to rotate the rotation lever in an internal space of the electronic device, and include a structure in which the ejecting operation is performed by pushing an end portion of the tray mounted in the electronic device by pressing in an outward direction of the electronic device according to a rotation operation of the rotation lever. Therefore, the eject bar may be pressed through the tray ejecting pin inserted through a pin insertion hole formed in the tray cover of the tray.

However, in the tray device, because the eject bars are disposed side by side outside the tray socket, the tray cover of the tray has to provide an additional space for a pin insertion hole for receiving an ejecting pin, which may be a retrogressive problem in slimming of the electronic device. Moreover, in a structure of an electronic device in which at least some of side members of a conductive material are used as the antenna, a mounting space occupied by the tray may cause difficulty in designing an antenna radiator.

SUMMARY

Embodiments of the disclosure provide a tray device and an electronic device including the same.

Embodiments of the disclosure provide a tray device capable of contributing to slimming of the electronic device and an electronic device including the same by reducing a mounting space of a tray.

Embodiments of the disclosure provide a tray device and an electronic device including the same configured to contribute to performance improvement of a peripheral electric structure by reducing a mounting space of a tray.

According to various example embodiments of the disclosure, an electronic device may include a housing including an opening connected to an internal space; a tray socket disposed to be connected to outside the housing through the opening in the internal space and including a tray reception space; a tray configured to be inserted into the tray reception space, wherein the tray includes a tray body including at least one space configured to receive at least one external component; and a tray cover including a pin insertion hole configured to guide a tray ejecting pin to the opening; an eject bar movably disposed in a tray mounting direction or ejecting direction in the tray reception space and facing the pin insertion hole; and a rotation lever configured to press the tray in the ejection direction based on pressing of the eject bar in the tray reception space, wherein the eject bar is disposed at a position at least partially overlapping the tray body when viewed from above the tray socket.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
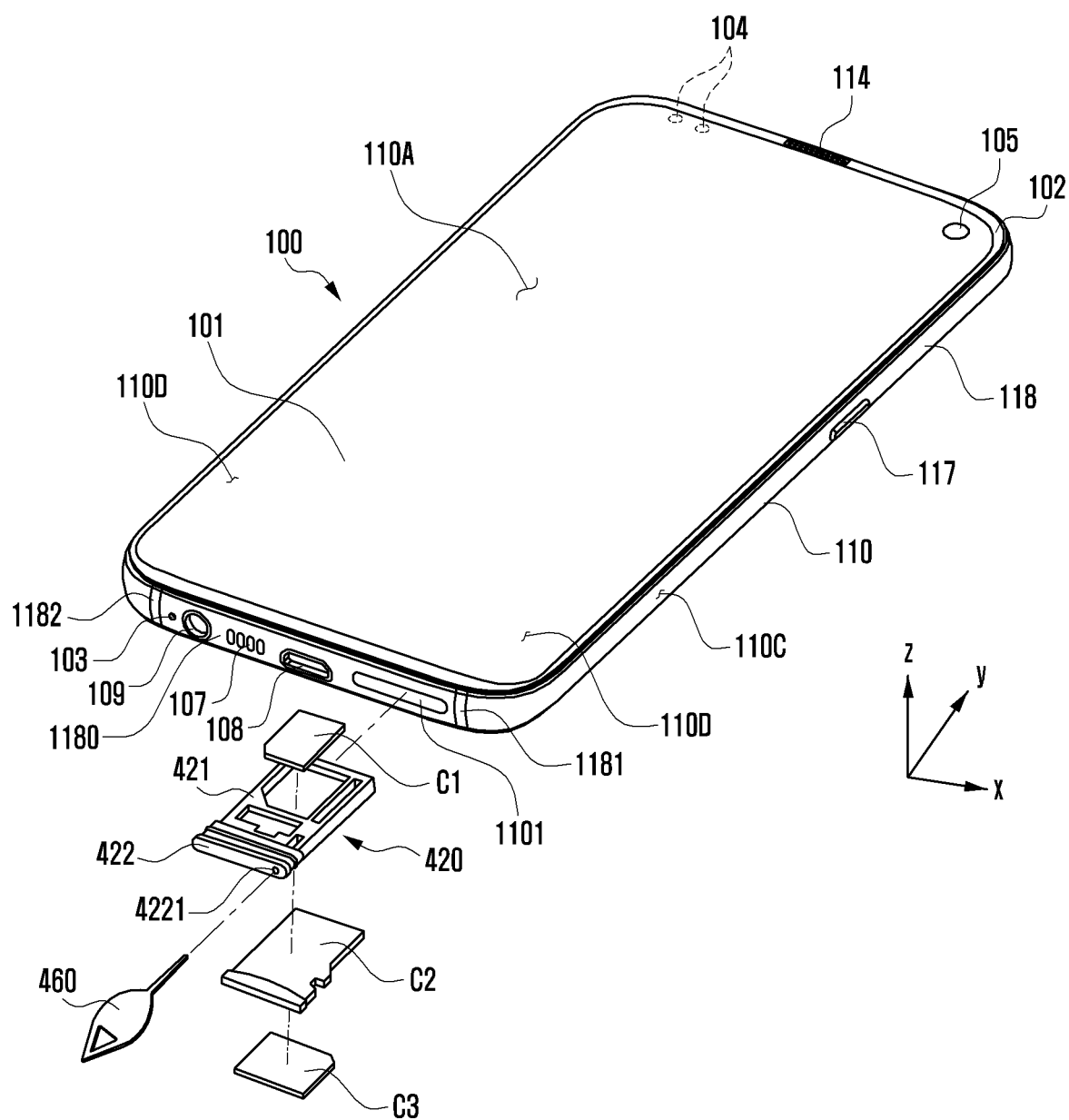
FIG. 1 is a front perspective view illustrating an example mobile electronic device according to various embodiments of the disclosure.
Figure 2:
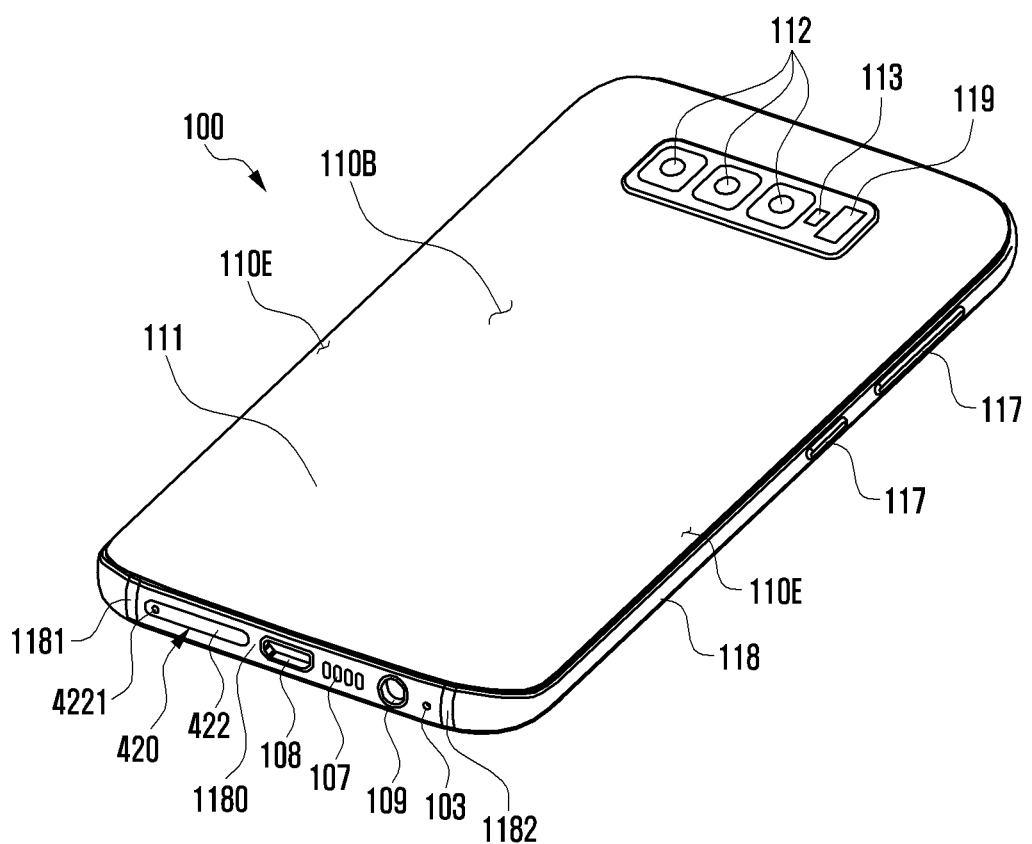
FIG. 2 is a rear perspective view the electronic device of FIG. 1 according to various embodiments of the disclosure.

FIG. 1 is a front perspective view illustrating an example mobile electronic device according to an embodiment of the disclosure, and FIG. 2 is a rear perspective view illustrating the mobile electronic device shown in FIG. 1 according to an embodiment of the disclosure.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector holes 108 and 109. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device. At least one of the audio module 114, the sensor module 104, the camera module 105, a fingerprint sensor (not shown), and the light emitting element may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Some sensor modules 105 of camera modules 105 and 212, some sensor modules 104 of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

According to various embodiments, the side bezel structure 118 (e.g., side member) may be formed with a conductive member (e.g., including a conductive material). According to an example embodiment, the side bezel structure 118 may include a conductive portion 1180 segmented through a pair of non-conductive portions 1181 and 1182 spaced at regular intervals. According to an embodiment, the conductive portion 1180 may be electrically connected to a wireless communication circuit disposed inside the electronic device 100 to be used as an antenna (e.g., legacy antenna) operating in a specific frequency band.

According to various embodiments, the electronic device 100 may include a tray 420 detachably disposed through an opening 1101 formed through at least a portion of the side bezel structure 118. According to an embodiment, the tray 420 may include a tray body 421 including a space inserted into the opening 1101 and for receiving at least one external component C1, C2, and C3 (e.g., card type external component) and a tray cover 422 disposed at an end portion of the tray body 421. According to an embodiment, the tray cover 422 may include a pin insertion hole 4221 formed so that at least a portion of a tray ejecting pin 460 may penetrate the opening 1101. According to an embodiment, the tray body 421 and the tray cover 422 may be integrally formed or may be configured by a combination of different members. According to an example embodiment, the tray 420 may be made of a metal material. In another embodiment, the tray 420 may be made of a polymer or a composite material. According to an embodiment, when the tray body 421 and the tray cover 422 are formed separately and assembled together, different kinds of members may be applied. According to an embodiment, when the tray 420 is mounted in the electronic device 100, the tray cover 422 is a portion exposed to the outside of the electronic device 100 and may be disposed in a manner corresponding to or non-corresponding to an outer surface (e.g., the side bezel structure 118) of the electronic device 100. According to an example embodiment, at least one external component C2 may include a memory card. According to an embodiment, at least one external component C1 and C3 may include a subscriber identification module (SIM) card or a user information module (UIM) card. According to an example embodiment, at least one external component C1, C2, and C3 may be formed in different sizes. According to an example embodiment, the at least one external component C1, C2, and C3 may be disposed in a manner to overlap the same surface of the tray body 421 or a surface facing in a direction opposite to each other.

According to various embodiments, when the tray body 421 having at least one mounted external component C1, C2, and C3 is mounted in the opening 1101 of the electronic device 100, the at least one external component C1, C2, and C3 may be electrically connected to the electronic device 100 inside the electronic device 100. According to an example embodiment, even if the at least one external component C1, C2, and C3 is mounted in the tray body 422, at least one conductive pad exposed through the tray 420 may be electrically connected in a manner to contact at least one conductive terminal disposed at a printed circuit board of the electronic device 100. According to an embodiment, as the tray body 421 may be inserted into a tray socket (e.g., a tray socket 410 of FIG. 3) disposed inside the electronic device 100, at least one exposed conductive pad may be electrically connected in a manner contacting at least one conductive terminal included within the tray socket mounted in the printed circuit board (e.g., a printed circuit board 340 of FIG. 3) of the electronic device 100.

Figure 3:
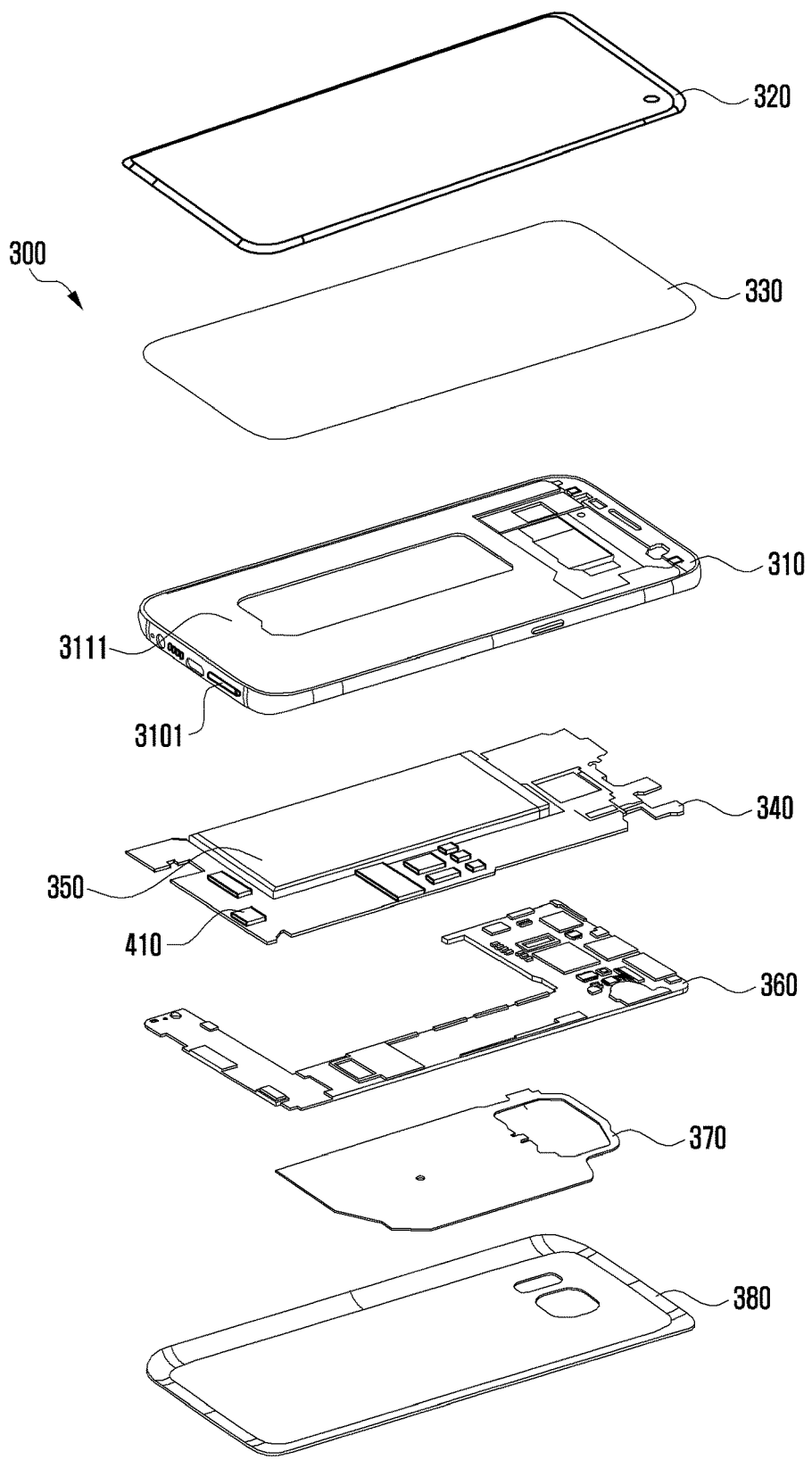
FIG. 3 is an exploded perspective view illustrating the electronic device of FIG. 1 according to various embodiments of the disclosure.

FIG. 3 is an exploded perspective view illustrating the mobile electronic device shown in FIG. 1 according to an embodiment of the disclosure.

Referring to FIG. 3, a mobile electronic device 300 may include a lateral bezel structure 310, a first support member 3111 (e.g., a bracket), a front plate 320, a display 400, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 3111 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The first support member 3111 is disposed inside the mobile electronic device 300 and may be connected to, or integrated with, the lateral bezel structure 310. The first support member 3111 may be formed of, for example, a metallic material and/or a non-metal (e.g., polymer) material. The first support member 3111 may be combined with the display 400 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 3111.

According to various embodiments, the electronic device 300 may include an opening 3101 (e.g., the opening 1101 of FIG. 1) connected to an internal space through the side member 310. According to an embodiment, the opening 3101 may be disposed at a position facing the tray socket 410 mounted in the printed circuit board 340 disposed in the internal space of the electronic device 300.

Figure 4:
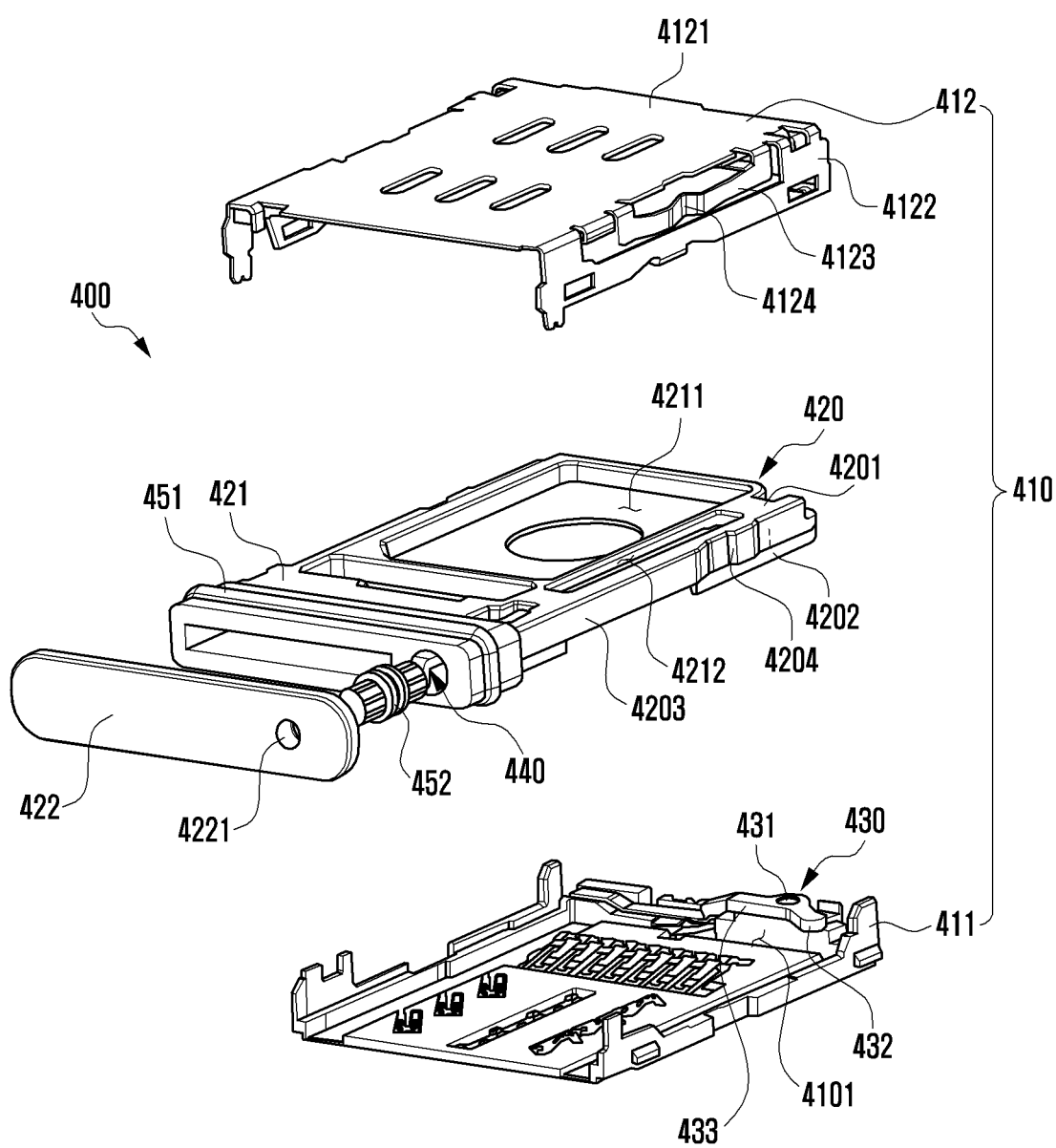
FIG. 4 is an exploded perspective view illustrating an example tray device according to various embodiments of the disclosure.
Figure 5:
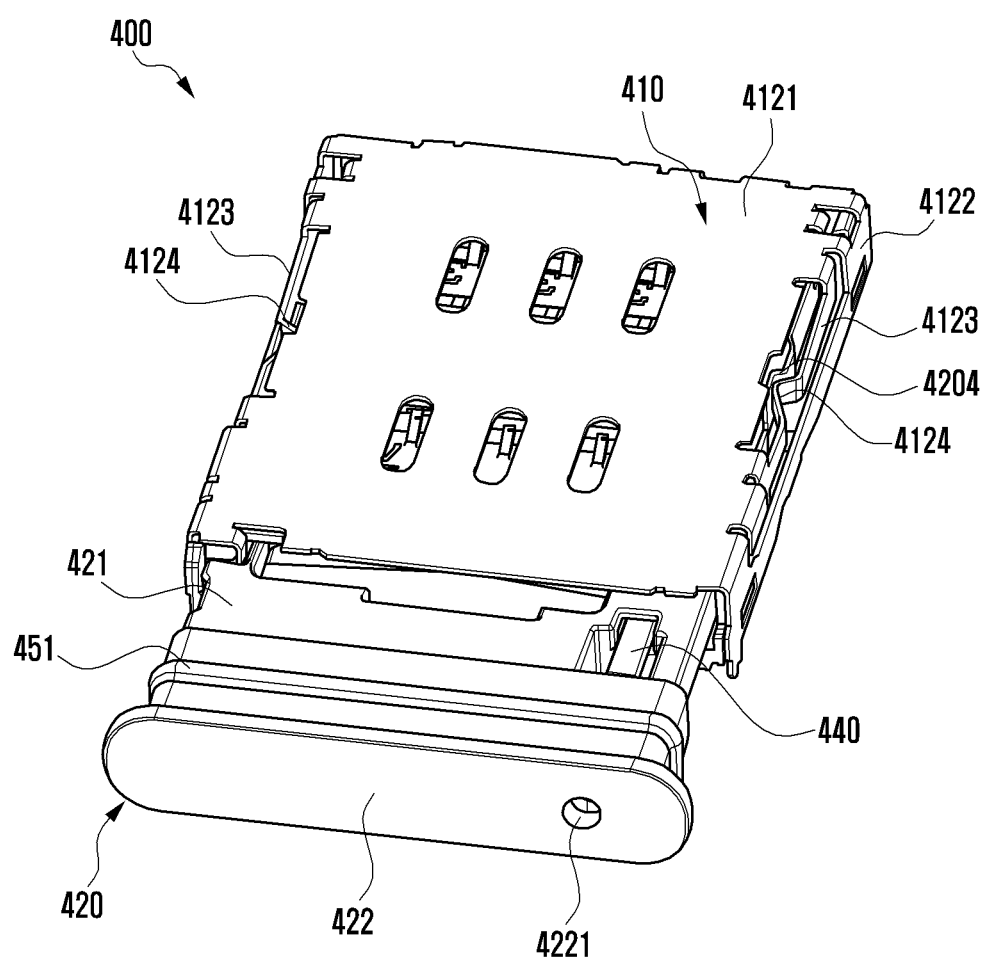
FIG. 5 is a perspective view illustrating an example tray device in a coupled state according to various embodiments of the disclosure.

FIG. 4 is an exploded perspective view illustrating an example tray device 400 according to various embodiments of the disclosure. FIG. 5 is a perspective view illustrating the tray device 400 in a coupled state according to various embodiments of the disclosure.

With reference to FIGS. 4 and 5, the tray device 400 may include a tray socket 410 disposed in an internal space of an electronic device (e.g., the electronic device 300 of FIG. 3), a tray 420 selectively inserted into the tray socket 410, a rotation lever 430 for ejecting the tray 420 inserted into the electronic device, and an eject bar 440 movably disposed in at least a portion of the tray 420 in order to induce a rotation of the rotation lever 430.

According to various embodiments, the tray socket 410 may be disposed inside the electronic device (e.g., the electronic device 300 of FIG. 3). According to an embodiment, the tray socket 410 may be mounted in a printed circuit board (e.g., the printed circuit board 340 of FIG. 3) disposed inside the electronic device 300. However, the disclosure is not limited thereto and may be disposed at various positions corresponding to an opening (e.g., the opening 3101 of FIG. 3) formed in the above-described electronic device. According to an example embodiment, the tray socket 410 may include a socket base 411 and a socket cover 412 coupled to the socket base 411. According to an example embodiment, the socket cover 412 may include a socket upper surface 4121 and a socket side surface 4122 at least partially bent from the socket upper surface 4121 and formed to provide a tray reception space 4101 together with the socket base 411. According to an embodiment, the socket base 411 and the socket cover 412 may be made of a metal material. In another embodiment, the socket base 411 may be made of a polymer material, and may be insert molded or structurally coupled to the socket cover 412 of a metal material. According to an embodiment, the tray socket 410 may include a tray reception space 4101 for receiving a tray body 421 of the tray 420 drawn through the opening 3101 formed in the electronic device 300. According to an example embodiment, the tray reception space 4101 may include at least one conductive terminal for electrically contacting at least one conductive pad exposed from at least one external component (e.g., at least one external component C1, C2, and C3 of FIG. 1) mounted in the tray body 421.

According to various embodiments, the tray socket 410 may include at least one elastic piece 4123 disposed at the socket side surface 4122 and facing the side surface 4203 of the tray body 421. According to an embodiment, the at least one elastic piece 4123 may include a latching portion 4124 protruding in the direction of the tray reception space 4101. According to an embodiment, the latching portion 4124 is latched by a latching jaw 4204 formed at a side surface 4203 of the mounted tray body 421. Thus, when the tray 420 is mounted in the electronic device 300, the tray 420 may be prevented from and/or avoid being arbitrarily separated or moved.

According to various embodiments, the tray 420 may include a tray body 421 mounted in an opening (e.g., the opening 3101 of FIG. 3) of the electronic device (e.g., the electronic device 300 of FIG. 3), and a tray cover 422 disposed at an end portion of the tray body 421. According to an embodiment, the tray body 421 may include a first surface 4201 facing in a first direction (e.g., z-axis direction of FIG. 1) and a second surface 4202 facing in a direction opposite to that of the first surface 4201, and a side surface 4203 enclosing a space between the first surface 4201 and the second surface 4202. According to an embodiment, the tray body 421 may include a first space 4211 disposed in at least a portion of the first surface 4201 and for receiving a first external component (e.g., the first external component C1 of FIG. 6) and a second space 4212 disposed near the first space 4211 and for receiving the eject bar 440 to be described later. According to an example embodiment, the tray body 421 may include a third space (e.g., a third space 4213 of FIG. 7B) disposed in at least a portion of the second surface 4202 and for receiving a second external component (e.g., the second external component C2 of FIG. 6) and/or a third external component (e.g., the third external component C3 of FIG. 6).

According to various embodiments, the tray 420 may include at least one latching jaw 4204 formed at the side surface 4203 of the tray body 421. According to an embodiment, when the tray 420 is mounted in the electronic device 300, the latching jaw 4204 may be formed in an intermittent structure in which the latching portion 4124 of the elastic piece 4123 of the tray socket 410 may be latched.

According to various embodiments, the tray 420 may include a pin insertion hole 4221 formed to penetrate the tray cover 422 at one side of the tray cover 422. According to an example embodiment, the pin insertion hole 4221 may receive a tray ejecting pin 460 for ejecting the tray 420 fixed to the tray socket 410. According to an example embodiment, the tray ejecting pin 460 may penetrate the pin insertion hole 4221 of the tray cover 422 to press a pin contact portion 442 of the eject bar 440 to be described later in a tray mounting direction. Therefore, the second space 4212 may be disposed at a position facing the pin insertion hole 4221 at least partially formed in the tray cover 422.

According to various embodiments, the rotation lever 430 may be installed to be rotatable in the socket base 411 of the tray socket 410. According to an embodiment, the rotation lever 430 may include a first end portion 432 pressed by the eject bar 440 based on a rotation shaft 431 and a second end portion 433 for pressing an end portion of the tray body 421 in a tray ejection direction based on the rotation shaft 431. According to an embodiment, the first end portion 432 and the second end portion 433 may be disposed with the rotation shaft 431 interposed therebetween.

According to various embodiments, the eject bar 440 may be disposed to have a length in a direction in which the tray body 421 is mounted in the second space 4212 provided at the first surface 4201 of the tray body 421. According to an example embodiment, the eject bar 440 may include a lever contact portion 441 (see, e.g., FIG. 7A) contacting the rotation lever 430 and a pin contact portion 442 pressed by the tray ejecting pin (e.g., the tray ejecting pin 460 of FIG. 1) introduced from the pin insertion hole 4221. According to an embodiment, the eject bar 440 may move in a tray detachable direction in the second space 4212, but may be controlled so as not to be separated from the tray 420.

According to an embodiment of the disclosure, the rotation lever 430 may be configured as a separate button type structure (not illustrated). According to an example embodiment of the disclosure, when a button is pressed by a pressing force of the eject bar 440, the tray 420 may be moved in an ejecting direction. According to an example embodiment of the disclosure, the tray may be ejected with various methods (e.g., button method, spring method, pop-up method, etc.).

According to various embodiments, the tray 420 may include a waterproof structure. According to an example embodiment, the tray 420 may include a first waterproof member (e.g., including a waterproof material) 451 enclosing at least a portion of the tray body 421 and for providing a sealing force between the tray body 421 and a side member (e.g., side member 310 of FIG. 3) when the tray 420 is mounted in the electronic device (e.g., the electronic device 300 of FIG. 3). According to an example embodiment, the tray 420 may include a second waterproof member (e.g., including a waterproof material) 452 for providing a sealing force to a space from the pin insertion hole 4221 of the tray cover 422 to the pin contact portion 442 of the eject bar 440. According to an example embodiment, the first waterproof member 451 and the second waterproof member 452 may include a member having various structures by silicone, rubber, urethane, etc., or a combination thereof.

According to various embodiments, the tray device 400 may further include a detection member (not illustrated) disposed inside the tray reception space 4101 and for detecting mounting and/or ejecting of the tray. According to an example embodiment, the detection member may include, for example, and without limitation, an optical flow sensor and/or a mechanical switch.

Figure 6:
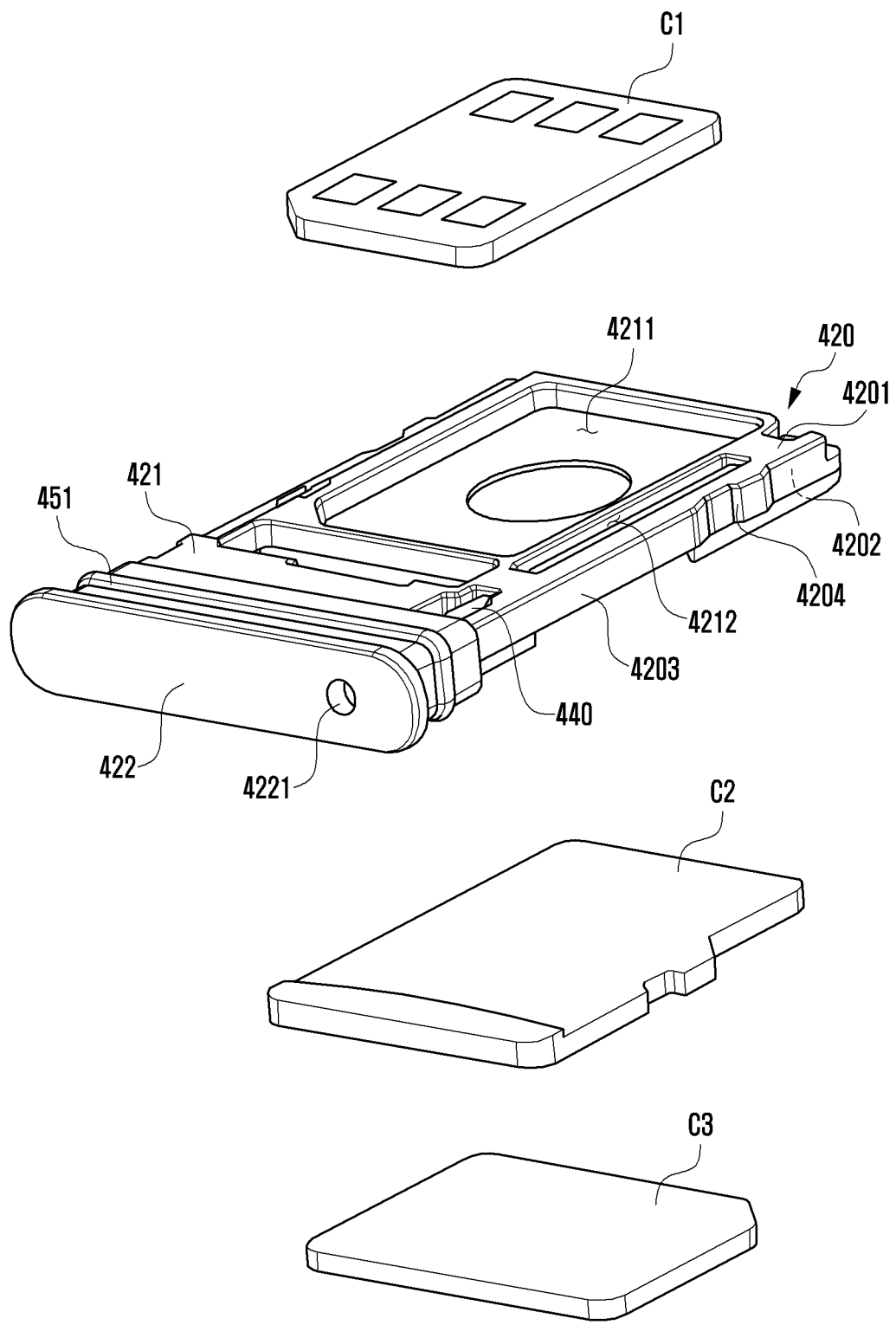
FIG. 6 is a perspective view illustrating an example tray device in a state in which external components are mounted in a tray according to various embodiments of the disclosure.
Figure 7A:
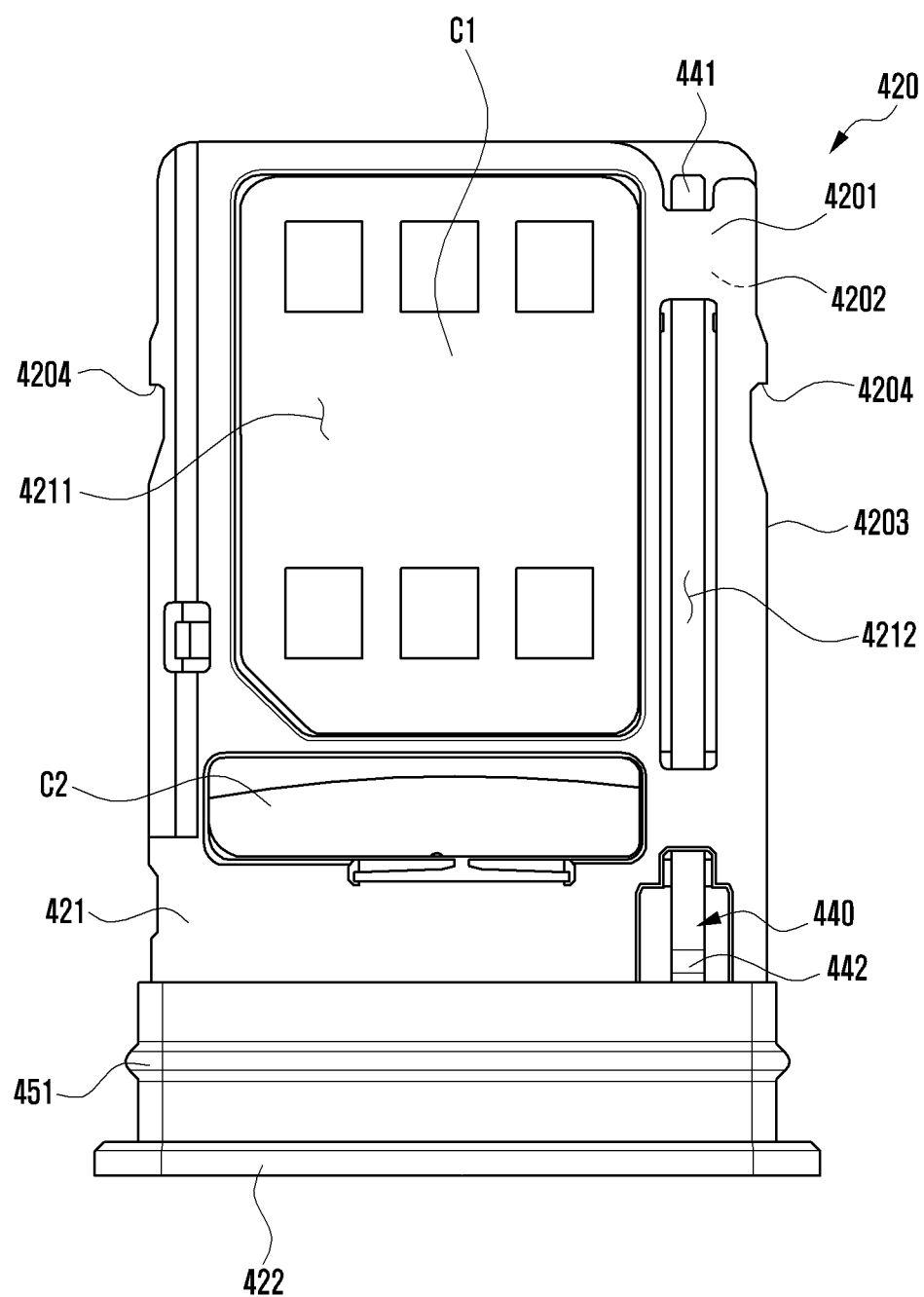
FIGS. 7A and 7B are diagrams illustrating an example configuration of a front surface and a rear surface of a tray in which external components are mounted according to various embodiments of the disclosure.
Figure 7B:
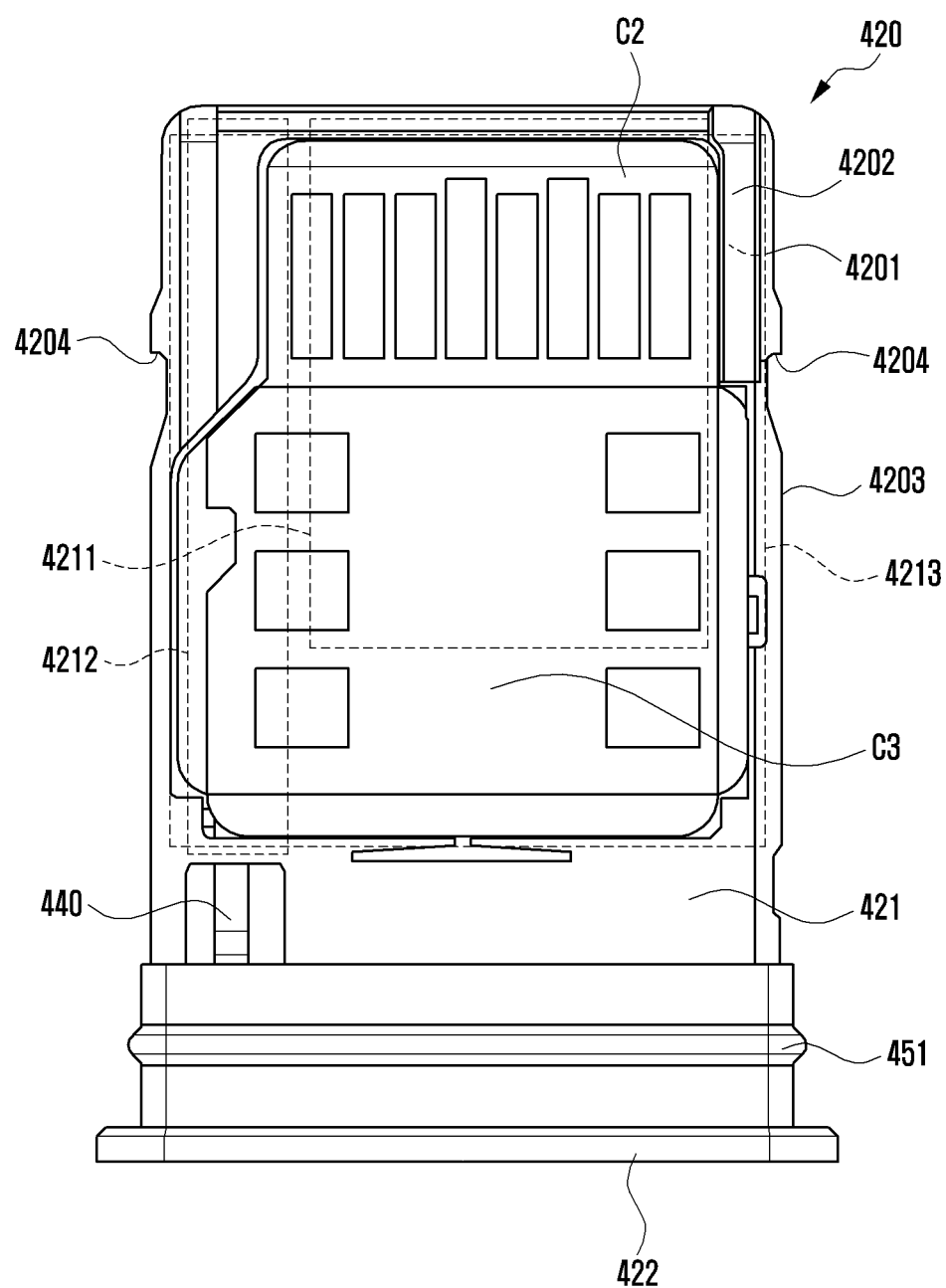

FIG. 6 is a perspective view illustrating a state in which external components C1, C2, and C3 are mounted in a tray 420 according to various embodiments of the disclosure. FIGS. 7A and 7B are diagrams illustrating a configuration of a front surface and a rear surface of a tray 420 in which external components C1, C2, and C3 are mounted according to various embodiments of the disclosure.

With reference to FIGS. 6, 7A and 7B, the tray 420 may include a tray body 421 and a tray cover 422 fixed to the tray body 421. According to an embodiment, the tray body 421 may include a first surface 4201, a second surface 4202 facing in a direction opposite to that of the first surface 4201, and a side surface 4203 enclosing a space between the first surface 4201 and the second surface 4202. According to an example embodiment, the tray body 421 may include a first space 4211 disposed in at least a portion of the first surface 4201 and for receiving a first external component C1 and a second space 4212 disposed near the first space 4211 and for receiving an eject bar 440. According to an example embodiment, the tray body 421 may include a third space 4213 disposed in at least a portion of the second surface 4202 and for receiving the second external component C2 and/or the third external component C3. According to an embodiment, when viewed from above the first surface 4201, the third space 4213 may be larger than the first space 4211. According to an embodiment, when viewed from above the first surface 4201, the second space 4212 may be disposed at a position at least partially overlapping the third space 4213.

According to various embodiments, the first external component C1 may be mounted in the first space 4211. According to an embodiment, the second external component C2 may be mounted in the third space 4213. According to an embodiment, the third external component C3 may be disposed to overlap at least a portion of the second external component C2 in the third space 4213. In another embodiment, the third external component C3 may be disposed side by side to be adjacent to the second external component C2 in the third space 4213. According to an embodiment, as the first space 4211 may occupy a smaller area than that of the third space 4213, the first external component C1 may be smaller in size than the second external component C2.

According to various embodiments of the disclosure, the eject bar 440 may at least partially overlap the third space 4213 in which the second external component C2 is mounted at the second surface 4202 when viewed from above the first surface 4201 and be disposed through the second space 4212 provided in the first surface 4201 of the tray body 421, thereby having a smaller mounting space than when the eject bar 440 is disposed outside the tray socket 410 and helping to slim down the electronic device 300 and to improve a performance of peripheral electrical structures.

Figure 8A:
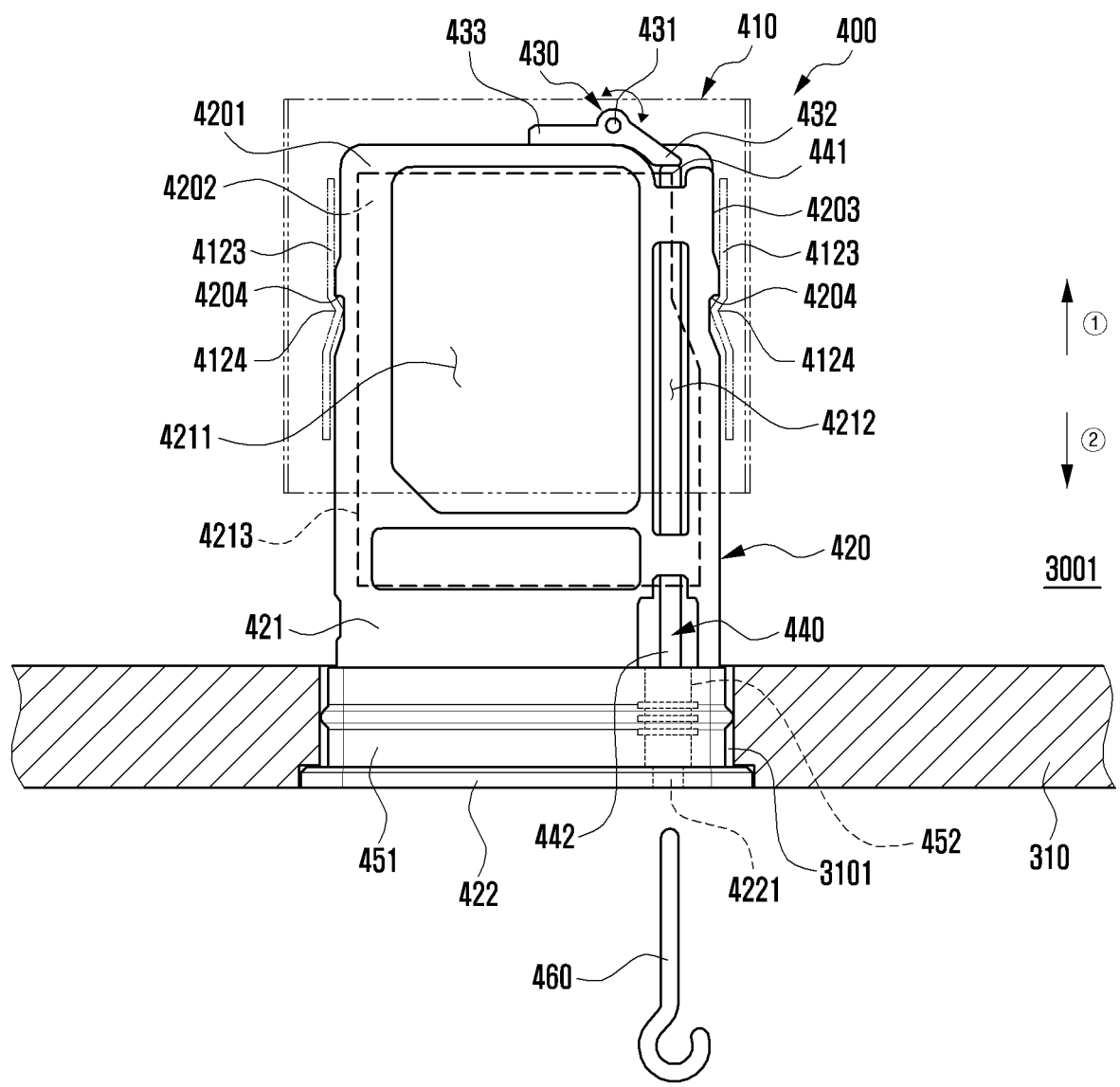
FIG. 8A is a diagram illustrating a state in which an example tray is mounted in an electronic device according to various embodiments of the disclosure.
Figure 8B:
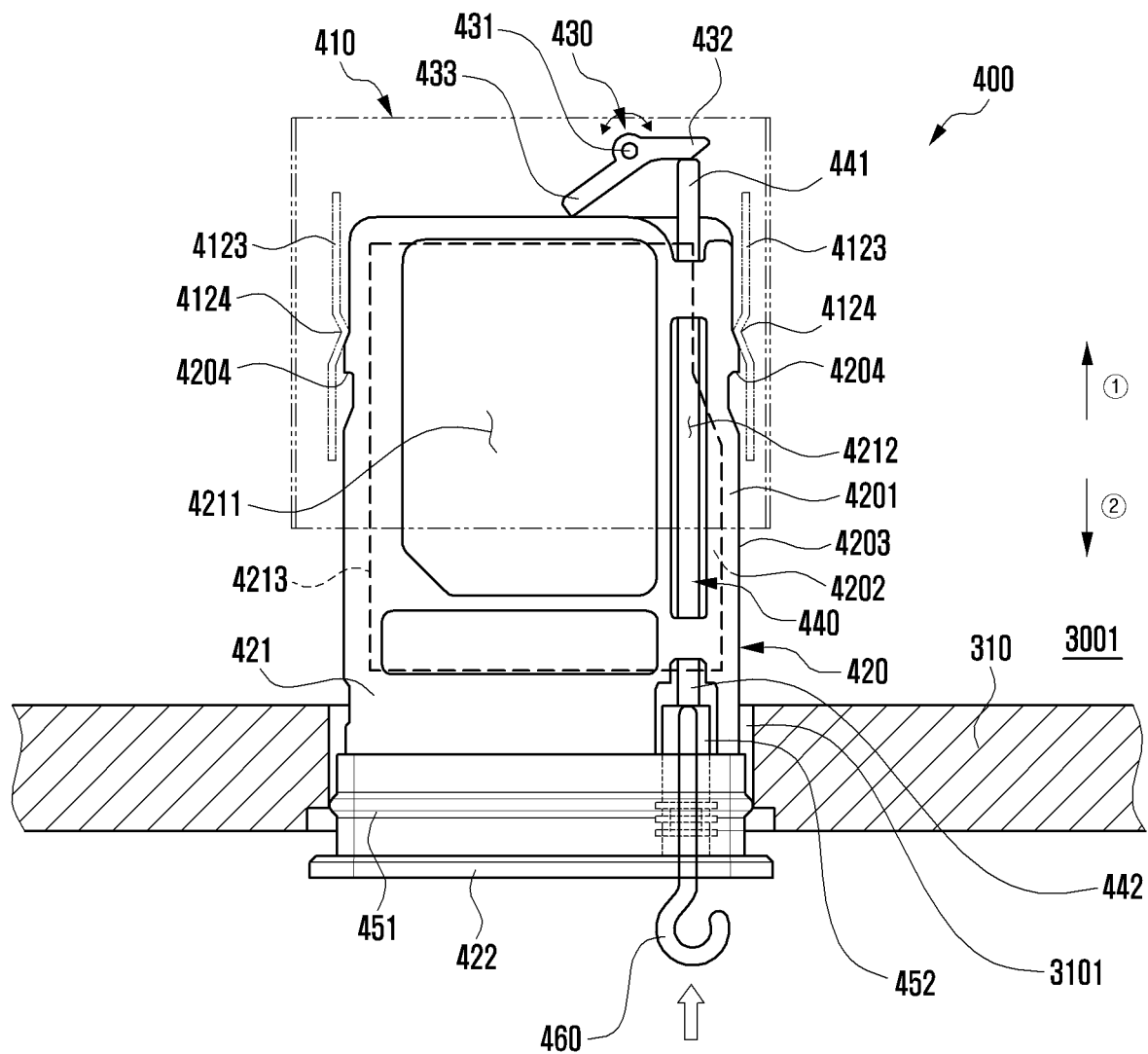
FIG. 8B is a diagram illustrating a state in which an example tray is ejected from an electronic device according to various embodiments of the disclosure.

FIG. 8A is a diagram illustrating a state in which a tray 420 is mounted in an electronic device 300 according to various embodiments of the disclosure. FIG. 8B is a diagram illustrating a state in which a tray 420 is ejected from an electronic device 300 according to various embodiments of the disclosure.

With reference to FIG. 8A, an electronic device (e.g., the electronic device 300 of FIG. 3) may include a tray device 400. According to an embodiment, the tray 420 of the tray device 400 may be disposed at least partially in an internal space 3001 of the electronic device 300 through the opening 3101 formed in the side member 310. According to an embodiment, when the tray 420 is mounted through the opening 3101 of the side member 310, the tray body 421 may be inserted into the tray socket 410. According to an example embodiment, in this case, the latching portion 4124 of the elastic piece 4123 of the tray socket 410 is latched by at least one latching jaw 4204 formed at the side surface 4203 of the tray body 421 and thus the tray 420 may be prevented from and/or avoid being separated to the outside of the electronic device 300. According to an embodiment, the tray cover 422 may be disposed to coincide with an outer surface of the side member 310. According to an embodiment, external moisture and/or a foreign material may be prevented from and/or avoid entering to the internal space 3001 of the electronic device 300 through the first waterproof member 451 disposed through the tray body 421 and the second waterproof member 452 disposed between the eject bar 440 and the pin insertion hole 4221.

According to various embodiments, when the tray 420 is inserted into the opening 3101 of the side member 310, the first end portion 432 of the rotation lever 430 may maintain a contact state with the lever contact portion 441 of the eject bar 440. According to an embodiment, the second end portion 433 of the rotation lever 430 may maintain a contact state with an end portion of the tray 420.

With reference to FIG. 8B, in order to eject the tray 420, when the tray ejecting pin 460 is inserted into the pin insertion hole 4221 of the tray cover 422, and when the tray ejecting pin 460 presses the pin contact portion 442 of the eject bar 440, the eject bar 440 may be moved by a predetermined length in a tray mounting direction (e.g., ① direction) in the second space 4212. As the eject bar 440 moves, the lever contact portion 441 of the eject bar 440 may press a first end portion 432 of the rotation lever 430. According to an example embodiment, the rotation lever 430 may rotate a second end portion 433 counterclockwise about the rotation shaft 431 by pressing the eject bar 440 and move the tray 420 in an ejecting direction (② direction) through a rotational force. For example, the tray 420 ejected to some extent from the opening 3101 of the side member 310 may be separated from the electronic device 300 by a user.

According to various embodiments, when the tray 420 is again mounted in the opening 3101 of the side member 310, the second end portion 433 of the rotation lever 430 may be pressed by an end portion of the tray 420 to rotate clockwise about the rotation shaft 431. Accordingly, the first end portion 432 may press the lever contact portion 441 of the eject bar 440 in an ejecting direction (② direction), and be returned to the same position as that illustrated in FIG. 8A in the second space 4212.

Figure 9:
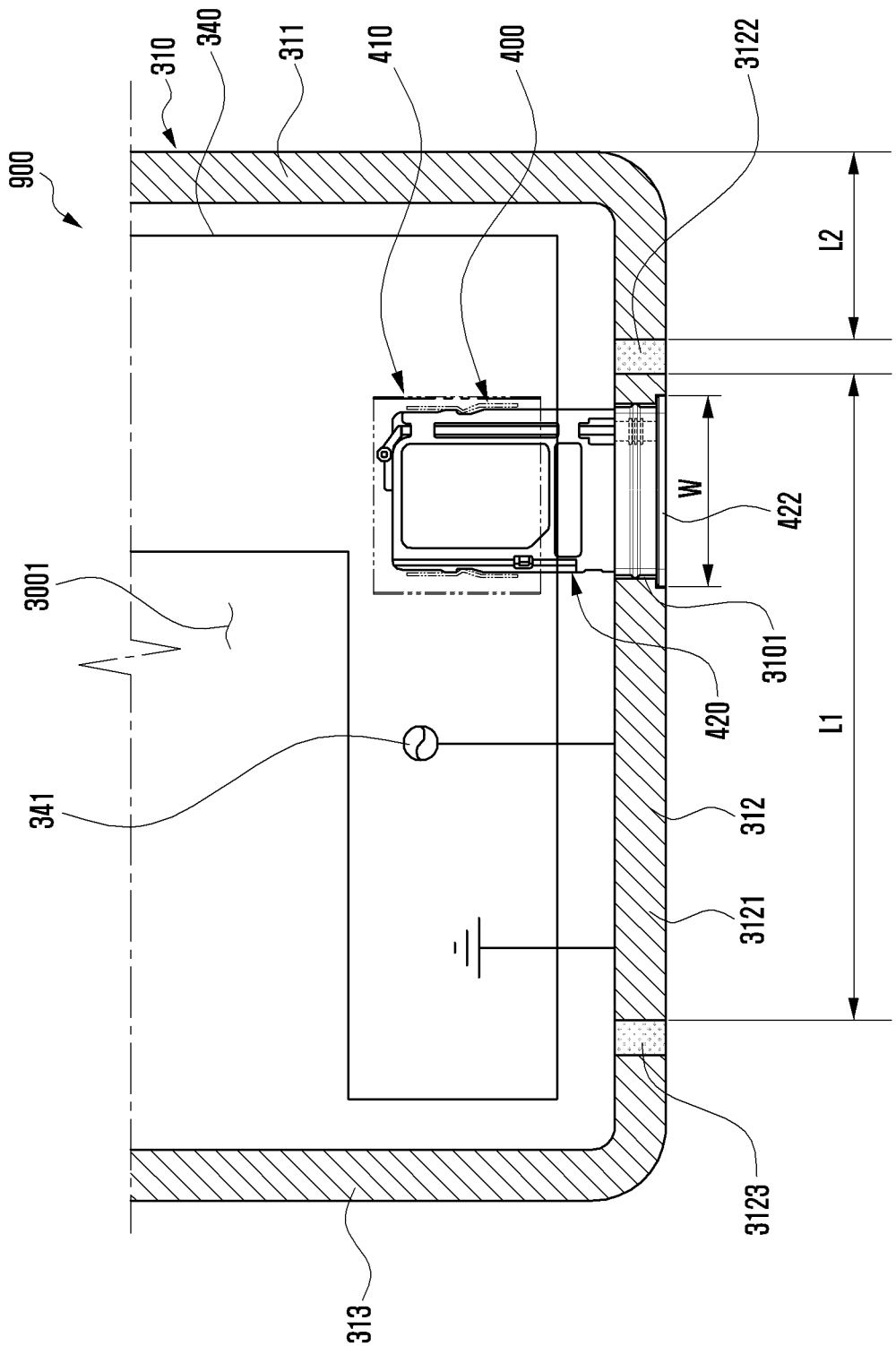
FIG. 9 is a diagram illustrating an example configuration of an electronic device in which an example tray device is disposed according to various embodiments of the disclosure.

FIG. 9 is a diagram illustrating an example configuration of an example electronic device 900 in which a tray device 400 is disposed according to various embodiments of the disclosure.

The electronic device 900 of FIG. 9 may be at least partially similar to the electronic device 100 of FIG. 1 or the electronic device 300 of FIG. 3 or may further include other embodiments of the electronic device.

With reference to FIG. 9, the electronic device 900 may include a side member 310. According to an embodiment, the side member 310 may include at least partially a conductive member (e.g., including a conductive material). According to an embodiment, the side member 310 may include a first side surface 311, a second side surface 312 extended in a direction perpendicular to the first side surface 311, a third side surface 313 extended in parallel to the first side surface 311 from the second side surface 312, and a fourth side surface (not illustrated) parallel to the second side surface 312 from the third side surface 313 and connected to the first side surface 311. According to an example embodiment, the side member 310 may include a conductive portion 3121 electrically insulated from a peripheral conductive side surface through non-conductive portions 3122 and 3123 spaced at regular intervals at the second side surface 312. According to an example embodiment, the conductive portion 3121 may be electrically connected to a wireless communication circuit 341 mounted in the printed circuit board 340 in an internal space 3001 of the electronic device 900 to be used as an antenna (e.g., legacy antenna) operating in at least one frequency band.

According to various embodiments, the electronic device 900 may include an opening 3101 formed through at least a portion of the conductive portion 3121 at the second side surface 312 of the side member 310. According to an embodiment, the electronic device 900 may include a tray device 400 mounted or ejected through the opening 3101. According to an embodiment, the tray device 400 may include a tray socket 410 disposed at a position facing the opening 3101 of the printed circuit board 340 and a tray 420 disposed to be detached from the tray socket 410 through the opening 3101. According to an example embodiment, an end portion of the tray cover 422 may be disposed adjacent to the non-conductive portion 3122.

According to various embodiments, in the tray device 400 according to an example embodiment of the disclosure, because an eject bar is disposed at a position at least partially overlapped with the tray 420 when viewed from above the front plate (e.g., the front plate 320 of FIG. 3) of the electronic device 900, a width w of the tray cover 422 may be reduced, and a mounting space of the tray device 400 in the electronic device 900 may be reduced. According to an example embodiment, as a width w of the tray cover 422 is reduced compared to a total length L1, it may be advantageous in designing an electrical length of the conductive portion 3121. In another embodiment, as the width w of the tray cover 422 is reduced, the non-conductive portion 3122 may be moved by a length reduced in a direction of the tray cover 422 and a length L2 between the non-conductive portion 3122 of the second side surface 312 and the first side surface 311 is thus increased. Thus, it may be advantageous for antenna design through at least a portion of the first side surface 311 and/or the second side surface 312. According to an example embodiment, the electrical length L1 or L2 of the antenna may be designed to be longer by a reduced size of the width W of the tray cover 422. Therefore, in an electronic device that is gradually slimmer, a mounting structure of a reduced tray according to an example embodiment of the disclosure may help to secure a radiation performance of the antenna for operating in a specific band (e.g., low band).

Figure 10:
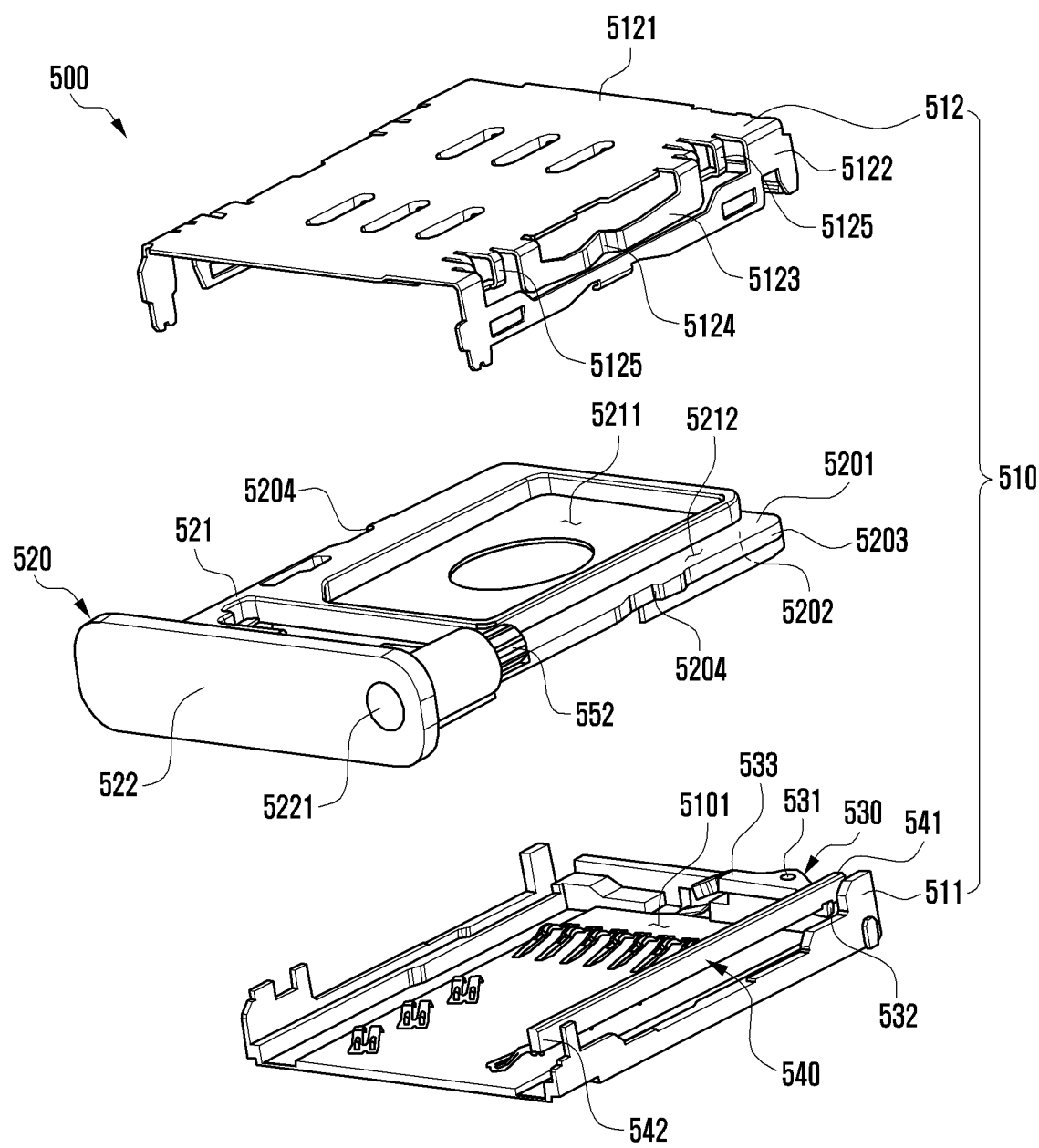
FIG. 10 is an exploded perspective view illustrating an example tray device according to various embodiments of the disclosure.
Figure 11:
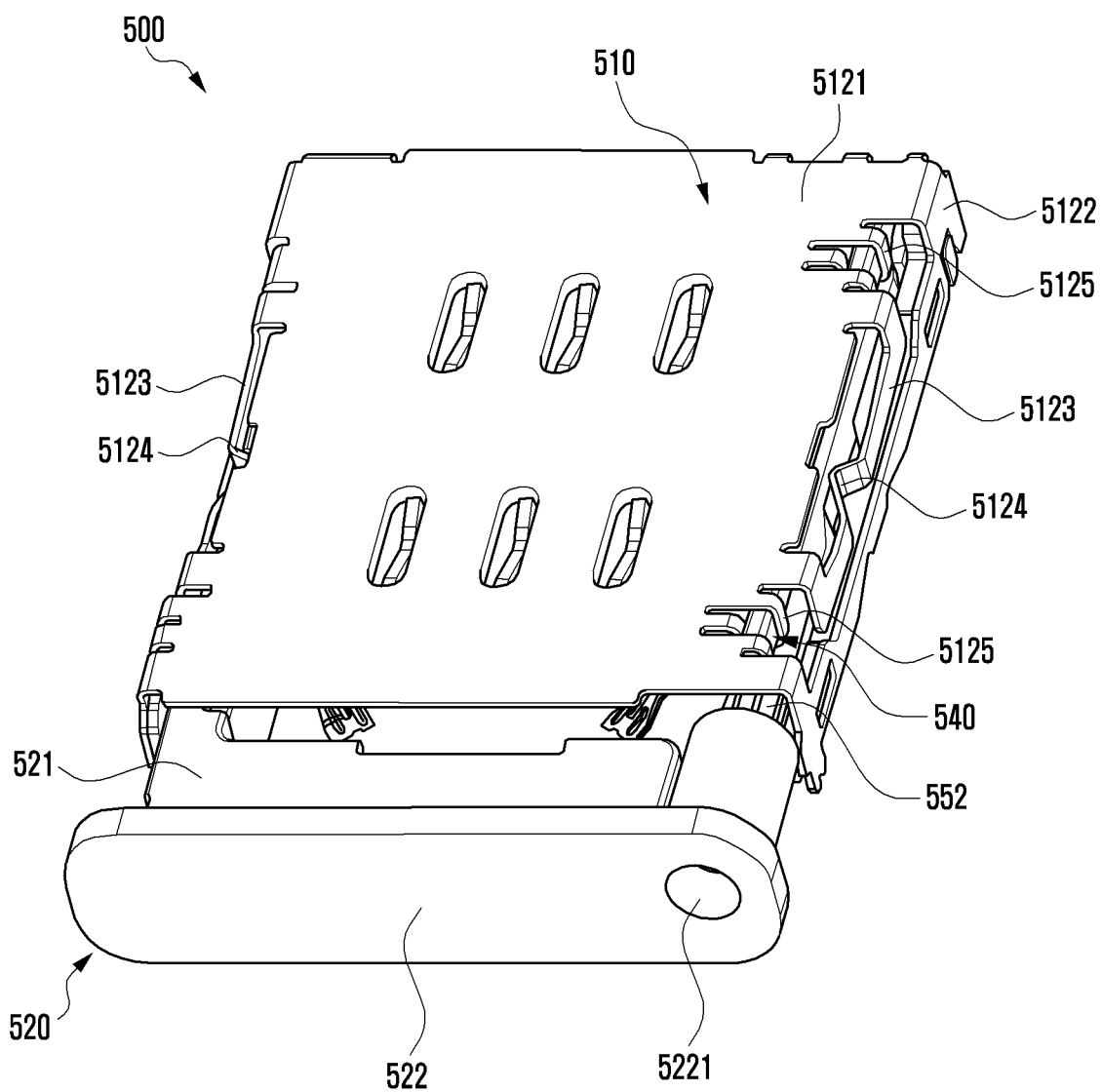
FIG. 11 is a perspective view illustrating an example tray device in a coupled state according to various embodiments of the disclosure.

FIG. 10 is an exploded perspective view illustrating an example tray device 500 according to various embodiments of the disclosure. FIG. 11 is a perspective view illustrating the tray device 500 in a coupled state according to various embodiments of the disclosure.

When describing with reference to FIGS. 10 and 11, in the tray device 500, a basic configuration of a tray socket 510 and a tray 520 disposed in the tray socket 510 except for a disposition position of an eject bar 540 may be substantially the same as that of the above-described tray device 400.

With reference to FIGS. 10 and 11, the tray device 500 may include a tray socket 510 disposed in an internal space of an electronic device (e.g., the electronic device 300 of FIG. 3), a tray 520 for selectively inserting into the tray socket 510, a rotation lever 530 for ejecting the tray 520 inserted into the electronic device, and an eject bar 540 movably disposed within a tray reception space 5101 of the tray socket 510 in order to induce a rotation of the rotation lever 530.

According to various embodiments, the tray socket 510 may include a socket base 511 and a socket cover 512 coupled to the socket base 511. According to an example embodiment, the socket cover 512 may include a socket upper surface 5121 and a socket side surface 5122 at least partially bent from the socket upper surface 5121 and formed to provide the tray reception space 5101 together with the socket base 511. According to an example embodiment, the tray socket 510 may include at least one elastic piece 5123 disposed in the socket side surface 5122 and facing a side surface 5203 of a tray body 521. According to an example embodiment, the at least one elastic piece 5123 may include a latching portion 5124 protruded in a direction of the tray reception space 5101. According to an embodiment, as the latching portion 5124 is latched by a latching jaw 5204 formed in the side surface 5203 of the mounted tray body 521, after the tray 520 is mounted in the electronic device 300, the tray 520 may be prevented from arbitrarily separating and moving. According to an embodiment, the tray socket 510 may include at least one lever guide portion 5125 formed from the socket side surface 5122 to the tray reception space 5101. According to an example embodiment, the eject bar 540 may be disposed to move in a tray mounting and ejecting direction along the lever guide portion 5125.

According to various embodiments, the tray 520 may include a tray body 521 mounted in an opening (e.g., the opening 3101 of FIG. 3) of the electronic device (e.g., the electronic device 300 of FIG. 3) and a tray cover 522 disposed at an end portion of the tray body 521. According to an embodiment, the tray body 521 may include a first surface 5201, a second surface 5202 facing in a direction opposite to that of the first surface 5201, and a side surface 5203 enclosing a space between the first surface 5201 and the second surface 5202. According to an embodiment, the tray body 521 may include a first space 5211 disposed in at least a portion of the first surface 5201 and for receiving the first external component (e.g., the first external component C1 of FIG. 12A), and a second space 5212 disposed near the first space 5211 and for receiving a movement space of the eject bar 540 to be described later. According to an example embodiment, the tray body 521 may include a third space 5213 disposed in at least a portion of the second surface 5202 and for receiving a second external component (e.g., the second external component C2 of FIG. 12B) and/or a third external component (e.g., the third external component C3 of FIG. 12B).

According to various embodiments, the tray 520 may include a pin insertion hole 5221 formed to penetrate the tray cover 522 at one side of the tray cover 522. According to an example embodiment, the pin insertion hole 5221 may receive a tray ejection pin (e.g., the tray ejection pin 460 of FIG. 1) for ejecting the tray 520 fixed to the tray socket 510.

According to various embodiments, the rotation lever 530 may be installed to be rotatable in the socket base 511 of the tray socket 510. According to an example embodiment, the rotation lever 530 may include a first end portion 532 pressed by the eject bar 540 based on a rotation shaft 531 and a second end portion 533 for pressing an end portion of the tray body 521 in a tray ejection direction based on the rotation shaft 531. According to an embodiment, the first end portion 532 and the second end portion 533 may be disposed with the rotation shaft 531 therebetween.

According to various embodiments, the eject bar 540 may be disposed to be at least partially received in the second space 5212 in the tray reception space of the tray socket. According to an example embodiment, the eject bar 540 may include a lever contact portion 541 contacting the rotation lever 530 and a pin contact portion 542 pressed by a tray ejecting pin (e.g., the tray ejecting pin 560 of FIG. 1) introduced from the pin insertion hole 5221. According to an embodiment, the eject bar 540 may move in a tray detachable direction in the second space 5212, but may be controlled so as not to be separated from the tray socket 510. According to an example embodiment, the tray 520 may include a waterproof member 552 substantially the same as that described above.

Figure 12A:
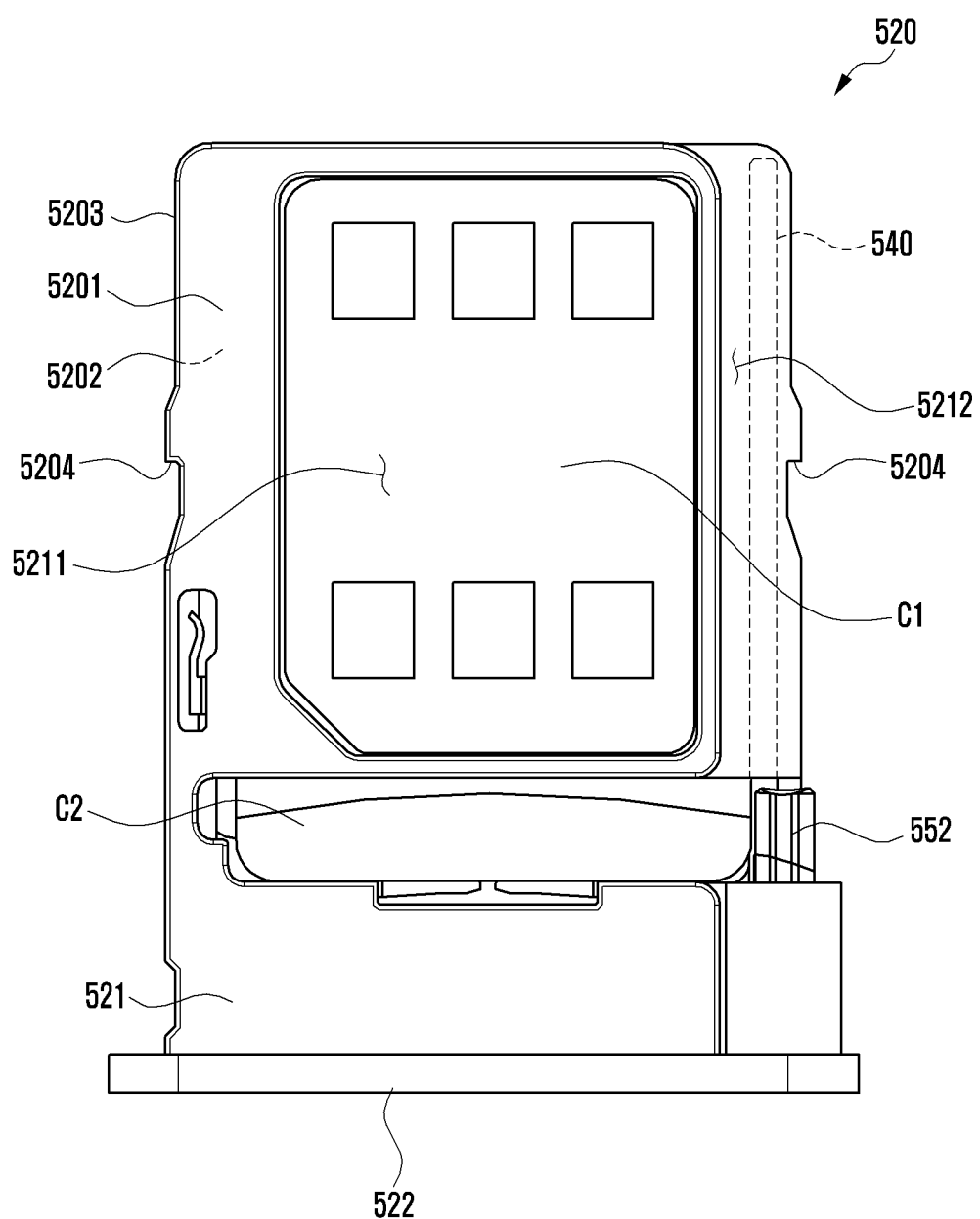
FIGS. 12A and 12B are diagrams illustrating an example configuration of a front surface and a rear surface of an example tray in which external components are mounted according to various embodiments of the disclosure.
Figure 12B:
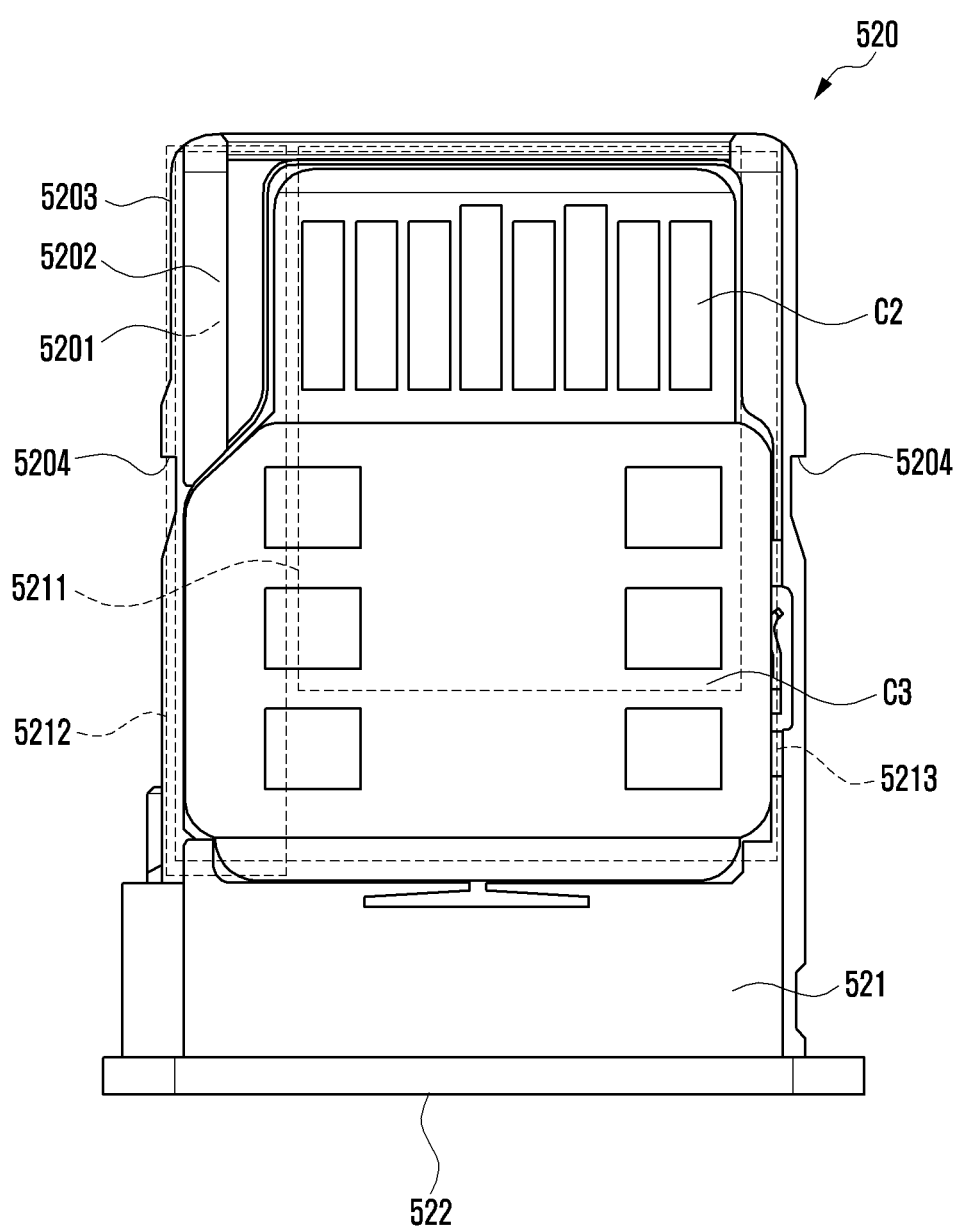

FIGS. 12A and 12B are diagrams illustrating an example configuration of a front surface and a rear surface of a tray in which external components are mounted according to various embodiments of the disclosure.

With reference to FIGS. 12A and 12B, the tray 520 may include a tray body 521 and a tray cover 522 fixed to the tray body 521. According to an example embodiment, the tray body 521 may include a first space 5211 disposed in at least a portion of the first surface 5201 and for receiving a first external component C1 and a second space 5212 disposed near the first space 5211 and for receiving the eject bar 540. According to an embodiment, the tray body 521 may include a third space 5213 disposed in at least a portion of the second surface 5202 and for receiving a second external component C2 and/or a third external component C3. According to an embodiment, when viewed from above the first surface 5201, the third space 5213 may be formed to be larger than the first space 5211. According to an embodiment, when viewed from above the first surface 5201, the second space 5212 may be disposed at a position at least partially overlapped with the third space 5213. According to an embodiment, as the first space 5211 may occupy a smaller area than that of the third space 5213, the first external component C1 may be smaller in size than the second external component C2.

According to various embodiments of the disclosure, as the eject bar 540 at least partially overlaps the third space 5213 in which the second external component C2 is mounted at the second surface 5202 when viewed from above the first surface 5201 and is disposed through the tray reception space 5101 provided in the tray socket 510, the eject bar 540 may have a smaller mounting space than when the eject bar 540 is disposed outside the tray socket 510 and may help to slim down the electronic device 300 and to improve a performance of a peripheral electrical structure.

Because the eject bar is disposed to overlap at least one external component mounting portion, a tray device according to various embodiments of the disclosure may help to slim down the electronic device by reducing a tray mounting space and to improve a performance of a peripheral electrical structure (e.g., antenna).

According to various example embodiments of the disclosure, an electronic device (e.g., the electronic device 300 of FIG. 3) may include: a housing (e.g., the housing 110 of FIG. 1) including an opening (e.g., the opening 3101 of FIG. 3) connected to an internal space; a tray socket (e.g., the tray socket 410 of FIG. 4) disposed to be connected to the outside through the opening in the internal space and including a tray reception space (e.g., the tray reception space 4101 of FIG. 4); a tray (e.g., the tray 420 of FIG. 4) configured to be inserted into the tray reception space, wherein the tray may include a tray body (e.g., the tray body 421 of FIG. 4) including at least one space configured to receive at least one external component (e.g., at least one external component C1, C2, and C3 of FIG. 6); and a tray cover (e.g., the tray cover 422 of FIG. 4) including a pin insertion hole (e.g., the pin insertion hole 4221 of FIG. 4) configured to guide a tray ejecting pin to the opening; an eject bar (e.g., the eject bar 440 of FIG. 4) movably disposed in a tray mounting direction or an ejecting direction in the tray reception space and facing the pin insertion hole; and a rotation lever (e.g., the rotation lever 430 of FIG. 4) configured to press the tray in the ejection direction based on pressing of the eject bar in the tray reception space, wherein when viewed from above the tray socket, the eject bar is disposed at a position at least partially overlapping the tray body.

According to various example embodiments, the tray body may include a first surface (e.g., the first surface 4201 of FIG. 4) including a first space (e.g., the first space 4211 of FIG. 4) configured to receive a first external component and a second space (e.g., the second space 4212 of FIG. 4) disposed near the first space and in which the eject bar is movably disposed; a second surface (e.g., the second surface 4202 of FIG. 4) facing in a direction opposite the first surface and including a third space (e.g., the third space 4213 of FIG. 7B) configured to receive a second external component; and a side surface (e.g., the side surface 4203 of FIG. 4) enclosing a space between the first surface and the second surface, wherein when viewed from above the first surface, the second space may overlap at least a portion of the third space.

According to various example embodiments, when viewed from above the first surface, the second space may overlap at least a portion of the third space.

According to various example embodiments, the first external component may be smaller than the second external component.

According to various example embodiments, the electronic device may further include a third external component disposed to at least partially overlap the second external component in the third space.

According to various example embodiments, the electronic device may further include a latch (e.g., the latching portion 4124 of FIG. 4) protruding from a side surface of the tray socket in a direction of the tray reception space, wherein based on the tray being mounted in the electronic device, the tray body may prevent and/or reduce an occurrence of the tray being separated by latching a latching portion to at least one latching jaw (e.g., the latching jaw 4204 of FIG. 4) disposed at the side surface.

According to various example embodiments, the rotation lever may be disposed to rotate by pressing of the eject bar.

According to various example embodiments, the rotation lever may include a rotation shaft (e.g., the rotation shaft 431 of FIG. 4) rotatably disposed in the tray socket in the tray reception space; a first end portion (e.g., the first end portion 432 of FIG. 4) extending from the rotation shaft and disposed at an interference position based on movement of the eject bar; and a second end portion (e.g., the second end portion 433 of FIG. 4) extending from the rotation shaft and disposed at an interference position based on movement of the tray body.

According to various example embodiments, based on the eject bar being pressed by a tray ejecting pin inserted into the pin insertion hole, a second end portion of the rotation lever may press the tray body in an ejecting direction of the tray.

According to various example embodiments, the electronic device may further include a first waterproof member (e.g., the first waterproof member 451 of FIG. 4) disposed to enclose the tray body; and a second waterproof member (e.g., the second waterproof member 452 of FIG. 4) disposed between the eject bar and the pin insertion hole.

According to various example embodiments, based on the tray body being inserted into the opening, the first waterproof member may contact an inner surface of the opening.

According to various example embodiments, the first waterproof member and/or the second waterproof member may include at least one of rubber, silicone, or urethane.

According to various example embodiments, the at least one external component may include at least one of a memory card, a subscriber identity module (SIM) card, or a user identity module (UIM) card.

According to various example embodiments, the housing may include a conductive portion, and the opening may be provided in the conductive portion.

According to various example embodiments, the conductive portion may include a portion (e.g., the conductive portion 3121 of FIG. 9) segmented from a peripheral conductive member through a pair of spaced non-conductive portions (e.g., the non-conductive portions 3122 and 3123 of FIG. 9), and the opening may be disposed adjacent to any one non-conductive portion (e.g., the non-conductive portion 3122 of FIG. 9) of the pair of non-conductive portions in the conductive portion.

According to various example embodiments, the electronic device may further include a wireless communication circuit (e.g., the wireless communication circuit 341 of FIG. 9) in the internal space (e.g., the internal space 3001 of FIG. 9) of the hosing and electrically connected to the conductive portion (e.g., the conductive portion 3121 of FIG. 9).

According to various example embodiments, the tray body (e.g., the tray body 521 of FIG. 10) may include a first surface (e.g., the first surface 5201 of FIG. 10) including a first space (e.g., the first space 5211 of FIG. 10) configured to face the front cover and to receive a first external component, and a second space (e.g., the second space 5212 of FIG. 10) adjacent to the first space and configured to movably receive the eject bar (e.g., the eject bar 540 of FIG. 10); a second surface (e.g., the second surface 5202 of FIG. 10) including a third space (e.g., the third space 5213 of FIG. 12B) configured to face in a direction opposite the first surface and to receive a second external component; and a side surface (e.g., the side surface 5203 of FIG. 10) enclosing a space between the first surface and the second surface, wherein when viewed from above the first surface, the second space may overlap at least a portion of the third space.

According to various example embodiments, the eject bar may be adjacent to at a position overlapping the second space when viewed from above the first surface.

According to various example embodiments, the tray socket (e.g., the tray socket 510 of FIG. 10) may include at least one lever guide (e.g., the lever guide portion 5125 of FIG. 10) protruding to the tray reception space, and the eject bar may be moved by the guide of the lever guide.

According to various example embodiments, the housing may include a front cover (e.g., the front cover 320 of FIG. 3); a rear cover (e.g., the rear cover 380 of FIG. 3) facing a direction opposite the front cover; a side surface (e.g., the side member 310 of FIG. 3) enclosing a space between the front cover and the rear cover and including the opening, and the electronic device may further include a display (e.g., the display 330 of FIG. 3) disposed to be viewable from the outside through at least a portion of the front cover in the internal space.

According to various example embodiments, the pin insertion hole may be configured to guide the tray ejecting pin to the opening.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. An electronic device, comprising:
a housing comprising an opening connected to an internal space of the electronic device;
a tray socket connected to outside the electronic device through the opening in the internal space and comprising a tray reception space;
a tray configured to be inserted into the tray reception space,
wherein the tray comprises:
a tray body comprising at least one space configured to receive at least one external component; and
a tray cover comprising a pin insertion hole;
an eject bar movably disposed in a tray mounting direction or ejecting direction in the tray reception space and facing the pin insertion hole; and
a rotation lever configured to press the tray in the ejection direction based on pressing of the eject bar in the tray reception space,
wherein the eject bar is disposed at a position at least partially overlapping the tray body when viewed from above the tray socket and is movable in the tray mounting direction or the ejecting direction between multiple surfaces of the tray body without being separated from the tray.

2. The electronic device of claim 1, wherein the tray body comprises:
a first surface comprising a first space configured to receive a first external component and a second space disposed within a specified proximity of the first space and in which the eject bar is movably disposed;
a second surface facing a direction opposite the first surface and comprising a third space configured to receive a second external component; and
a side surface enclosing a space between the first surface and the second surface,
wherein the second space overlaps at least a portion of the third space, when viewed from above the first surface.

3. The electronic device of claim 2, wherein the second space overlaps at least a portion of the third space, when viewed from above the first surface.

4. The electronic device of claim 2, wherein the first external component is smaller than the second external component.

5. The electronic device of claim 2, further comprising a third external component at least partially overlapping the second external component in the third space.

6. The electronic device of claim 2, further comprising a latch protruding from a side surface of the tray socket in a direction of the tray reception space,
wherein the tray body is configured to engage the latch and at least one latching jaw disposed at the side surface, based on the tray being mounted in the electronic device.

7. The electronic device of claim 1, wherein the rotation lever is disposed to rotate based on pressing of the eject bar.

8. The electronic device of claim 7, wherein the rotation lever comprises:
a rotation shaft rotatably disposed in the tray socket in the tray reception space;
a first end portion extending from the rotation shaft and disposed at an interference position based on movement of the eject bar; and
a second end portion extending from the rotation shaft and disposed at an interference position based on movement of the tray body.

9. The electronic device of claim 8, wherein a second end portion of the rotation lever is configured to press the tray body in an ejecting direction of the tray, based on the eject bar being pressed by a tray ejecting pin inserted into the pin insertion hole.

10. The electronic device of claim 1, further comprising:
a first waterproof member disposed to enclose the tray body; and
a second waterproof member disposed between the eject bar and the pin insertion hole.

11. The electronic device of claim 10, wherein the first waterproof member is configured to contact an inner surface of the opening based on the tray body being inserted into the opening.

12. The electronic device of claim 1, wherein the at least one external component comprises at least one of a memory card, a subscriber identity module (SIM) card, or a user identity module (UIM) card.

13. The electronic device of claim 1, wherein the housing comprises a conductive member comprising a conductive material, and
the opening is formed through the conductive member.

14. The electronic device of claim 13, wherein the conductive member comprises a conductive portion segmented from a peripheral conductive member through a pair of spaced non-conductive portions, and
the opening is disposed adjacent to any one non-conductive portion of the pair of non-conductive portions in the conductive portion.

15. The electronic device of claim 14, further comprising a wireless communication circuit disposed in the internal space of the electronic device and electrically connected to the conductive portion.

16. The electronic device of claim 1, wherein the tray body comprises:
a first surface comprising a first space facing a front cover and configured to receive a first external component and a second space disposed within a specified proximity of the first space and configured to movably receive the eject bar;
a second surface comprising a third space facing a direction opposite the first surface and configured to receive a second external component; and
a side surface enclosing a space between the first surface and the second surface,
wherein the second space overlaps at least a portion of the third space when viewed from above the first surface.

17. The electronic device of claim 16, wherein the eject bar is disposed at a position overlapping the second space when viewed from above the first surface.

18. The electronic device of claim 16, wherein the tray socket comprises at least one lever guide protruding to the tray reception space, and
the eject bar is configured to be moved by the lever guide.

19. The electronic device of claim 1, wherein the housing comprises:
- a front cover;
- a rear cover facing a direction opposite the front cover; and
- a side surface enclosing the internal space between the front cover and the rear cover and comprising the opening, and
- the electronic device further comprising a display disposed to be viewable from the outside through at least a portion of the front cover in the internal space.

20. The electronic device of claim 1, wherein the pin insertion hole is configured to guide a tray ejecting pin to the opening.

* * * * *